Figure 1:
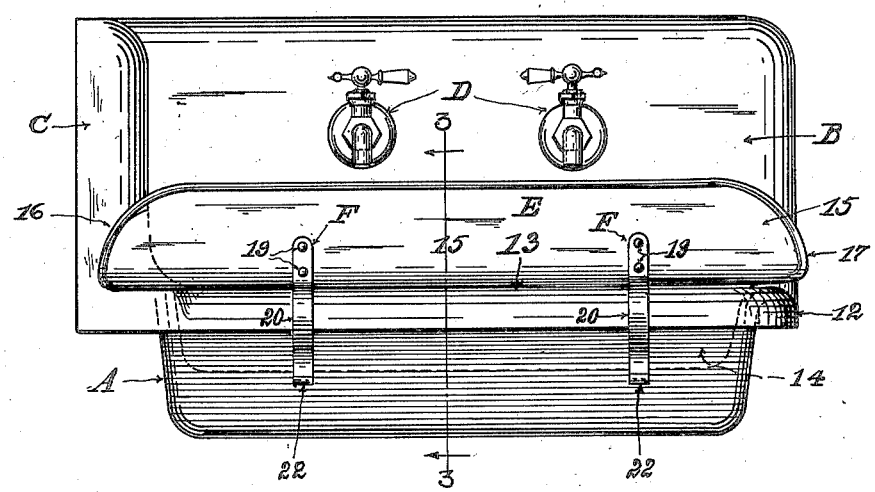

B. HENNING.
SPLASH GUARD FOR KITCHEN SINKS AND THE LIKE.
APPLICATION FILED JAN. 24, 1919.

1,302,658.

Patented May 6, 1919.

WITNESS:

INVENTOR:
BESSIE HENNING,
BY Michael J. Stark & Sons,
ATTORNEYS.

UNITED STATES PATENT OFFICE.

BESSIE HENNING, OF CHICAGO, ILLINOIS.

SPLASH-GUARD FOR KITCHEN-SINKS AND THE LIKE.

1,302,658. Specification of Letters Patent. Patented May 6, 1919.

Application filed January 24, 1919. Serial No. 272,851.

*To all whom it may concern:*

Be it known that I, BESSIE HENNING, a citizen of the United States, and a resident of the city of Chicago, in the county of Cook and State of Illinois, have invented a certain new and useful Improvement in Splash-Guards for Kitchen-Sinks and the like; and I do hereby declare that the following description of my said invention, taken in connection with the accompanying sheet of drawing, forms a full, clear, and exact specification, which will enable others skilled in the art to which it appertains to make and use the same.

My invention relates generally to improvements in splash guards for kitchen sinks and the like; and it consists, essentially, in the novel and peculiar combination of parts and details of construction, as hereinafter first fully set forth and described and then pointed out in the claims.

The object of this invention is the production of an efficient, serviceable, and comparatively inexpensive splash guard for kitchen sinks and the like, to prevent the splashing and spattering of water when drawn from the water faucets, or when washing dishes, preparing foods and the like. A further object of this invention is to so construct this guard that it can be readily applied to, and removed from, the kitchen sink, and hung up when not in use.

It is a well-recognized fact that the splashing of water when being drawn from the sink-faucets, or when dishes are being washed and rinsed, or food being prepared, is a perfect nuisance since it not only soils the usually rather delicate garments when thus engaged, notwithstanding the fact that generally a protective apron is worn by the attendant, but it litters the kitchen floor or spoils the linoleum with which the floor is covered, and requires nasty cleaning up, work which my invention is designed to overcome.

To attain these desirable objects, and others which will hereinafter appear, I construct this guard in the preferred embodiment of my invention, as shown in the drawings forming a part of this specification, and in which—

Figure 2:
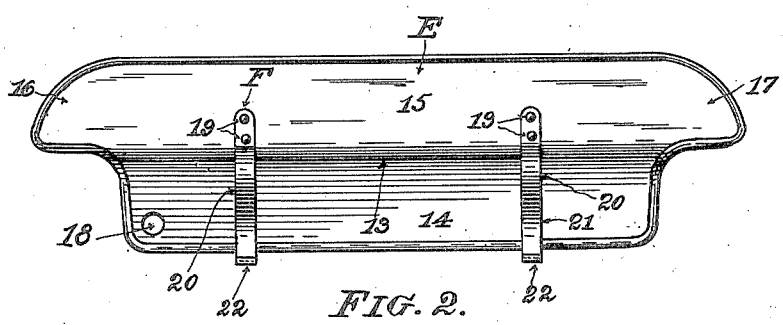
Figure 3:
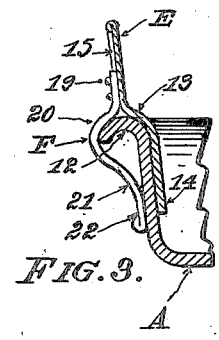
Figure 4:
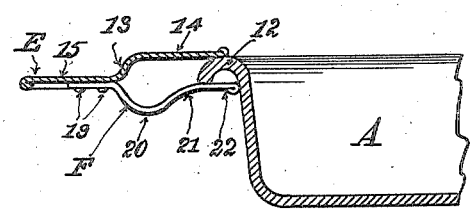

Figure 1 is a front elevation of a kitchen sink to which my invention is applied. Fig. 2 is a front elevation of the splash-guard detached. Fig. 3 is a sectional elevation of the device on line 3—3 of Fig. 1. Fig. 4 is a similar sectional view showing the manner of applying the guard to the sink.

Like parts are designated by the same characters and numerals of reference in all the figures.

A, in these drawings designates the kitchen sink proper. It is, preferably, of the present-day sanitary construction, having the wall-back B, and a wall-side C; there being connected to the wall-back the usual hot, and cold, water faucets D. This sink proper has the usual rim-roll 12, or as in the case of some of the older styles of sinks, an outwardly extending rim-flange, it being understood that my invention is applicable to either style of these sinks.

The splash-guard E, comprises a metallic plate of peculiar formation, which is constructed of sheet steel, copper, brass, aluminum or the like, and when made from the baser metals may be enameled or otherwise coated to prevent rusting. It is longitudinally formed with an offset or roll 13, the lower portion 14 of which is adapted to enter the sink, while the upper portion 15 projects from the rim-roll 12, about medially thereof, so that when applied to the sink the offset portion 12 rests upon the rim-roll and is supported thereby. This plate has on its upper portion 15, laterally extending projections 16, 17, which are designed to overlap the front portion of the wall-side C, which wall-side may be at the left of the sink, as shown in Fig. 1, or at the right thereof, according to the location of the sink in a kitchen, the guard being thus constructed to accommodate either kind of sinks; and in order to enable this guard being hung up, out of the way when not in use, a properly-located hole 18, is provided for this purpose.

To the back of the upper portion 15 of the guard, there is secured, preferably by rivets 19, a multiplicity of catches F. These catches are, preferably, metallic bars of proper width and thickness, and of a resilient nature. They are outwardly curved, as at 20, the curvature being adjacent the cuvature 13 in the splash-board, and bearing upon the rim-roll 12. These catches are then inwardly bent, as at 21, so that normally the extremities of the catches bear upon the outer surface of the lower portion 14 of the guard E. The terminals 22 of the catches F extend some distance beyond the lower margin of the guard, as best seen in Fig. 2; and they are then doubled up upon themselves to afford rounded ends which facilitate the application of the guard to the sink.

To apply this guard, the terminals 22 of the catches F are placed underneath the lower edge of the rim-roll 12, and then the guard lifted and pushed so that the lower margin of the guard will pass over the top of the rim-roll, when the guard can be pushed down until its curvature 13, and that of the catches 20, bear upon the rim-roll, which will properly locate the guard, the terminals of the catches bearing upon the outside surface of the sink, and thus hold the guard in proper position. To remove the guard the upper portion thereof is taken hold of and turned to the horizontal position, when the guard may be readily pulled off from the rim-roll.

Attention is now directed to the fact that all the corners and angles of the guard are well rounded, and that the marginal edges thereof are either hemmed or rolled so as to present no sharp edges or corners where a person might be injured when coming in contact therewith.

It is evident that inasmuch as kitchen sinks vary in length, the guard must either be made correspondingly, or a guard of shortest length be used. It is, furthermore, obvious that the two side-extensions 16, 17, of the upper portion 15 of the guard may be dispensed with, if desired, without departing from the scope of my invention.

Having thus fully described my invention, I claim as new and desire to secure to myself by Letters Patent of the United States—

1. A splash guard adapted for use on kitchen sinks and the like, comprising a sheet metallic plate, said plate having formed therein a longitudinal curvature or offset approximately medially of its width and extending the entire length of said plate to afford upper and lower members, and a multiplicity of catches secured at one end to the back of the upper portion of the guard, said catches being outwardly curved to correspond to the curvature of the rim roll, and then inwardly curved, the terminals of the catches being in parallel relationship to the lower portion of the guard and normally contacting therewith, the ends of the catches extending beyond the lower margin of the guard, said catches being resilient.

2. A splash guard for use on kitchen sinks and the like, comprising a sheet metallic plate, said plate having formed therein a longitudinal curvature or offset approximately medially of its width to bear upon the upper surface of the rim roll and to afford upper and lower members, there being on the upper member laterally extending projections having rounded corners, constructed to overlie one or the other of the end walls of the sink, the lower portion of the splash guard being constructed to enter the sink and to bear against the inner surface of the front wall of the sink, and a multiplicity of catches secured at one end to the back of the upper member, said catches being outwardly curved to correspond to the curvature of the rim roll and then inwardly bent, the terminals of the catches being in parallel relationship to the lower portion of the guard in normal condition and contacting therewith, the ends of the catches extending beyond the lower margin of the guard, said catches being resilient.

In testimony that I claim the foregoing as my invention, I have hereunto set my hand.

Mrs. BESSIE HENNING.